United States Patent

[11] 3,596,192

[72] Inventor Charles L. Lutes
 Anaheim, Calif.
[21] Appl. No. 799,038
[22] Filed Feb. 13, 1969
[45] Patented July 27, 1971
[73] Assignee North American Rockwell Corporation

[54] NONLINEAR LOW-PASS FILTER
 12 Claims, 6 Drawing Figs.
[52] U.S. Cl. ................................................ 328/165,
 328/151
[51] Int. Cl. .......................................... H03k 17/00
[50] Field of Search .......................... 328/137,
 138, 140, 151, 165, 167; 307/233, 295; 333/70 A

[56] References Cited
 UNITED STATES PATENTS
3,412,338 11/1968 Bernstein et al. ............. 328/137 X
3,414,824 12/1968 Weidman et al ...... 328/167

*Primary Examiner*—Roy Lake
*Assistant Examiner*—James B. Mullins
*Attorneys*—William R. Lane, L. Lee Humphries and Rolf M. Pitts

ABSTRACT: A low-pass filter, the frequency response of which demonstrating substantially no attenuation at frequencies below a preselected break frequency and having substantially zero volts per volt gain at frequencies above the break frequency. First and second oppositely poled unipolarly conductive signalling channels are output coupled to respective inputs of a summing integrator for alternatively coupling an output of and a peak-detected, sampled-and-held output of a differentiator to an input of the integrator. The time interval of the coupling of the peak-detected, sampled-and-held differentiator output corresponds to the break frequency of the filter.

INVENTOR.
CHARLES L. LUTES
BY
Roy M. Pitts
ATTORNEY

INVENTOR.
CHARLES L. LUTES

INVENTOR.
CHARLES L. LUTES

BY
ATTORNEY

NONLINEAR LOW-PASS FILTER

BACKGROUND OF THE INVENTION

The use of a low-pass filter to discriminate low frequency spectral content signal components (having informational content of interest) from high frequency signals representing noise or data or no interest, is well known in the art. In a closed-loop vehicle attitude control system, for example, the rigid body motion dynamics, as sensed by gyros and the like for attitude stabilization and control of the vehicle, may be data of essentially low frequency spectral content, relative to other data sensed by the sensors, such as onboard equipment-induced vibration and vehicle-bending modes. Vehicle control system response to such higher frequency structural modes may result in intercoupling of the vehicle control mode and the structural modes, as to comprise effective rigid body attitude and trajectory control; and may even induce negative damping or instability in such airframe structural modes, as to cause structural fatigue and failure of the airframe. Accordingly, undesired control system response to such high frequency spectral content in the control system feedback signal is avoided by the use of low-pass filters.

The prior art use of linear low-pass filters is of limited effectiveness, for the reason that the attenuation rate above a preselected low-pass frequency is limited in each filter state. Further, the gain below the break frequency is not sufficiently constant, but increasingly attenuated as the break frequency is approached. An example of such a linear low-pass filter is a classical RC network or an analog integrator (in closed-loop cooperation), each of which devices demonstrates the transfer function, $$G(s) = \frac{1}{Ts+1},$$

where $T$ in seconds is the reciprocal of the filter break frequency in radians per second. In the case of the RC network, $T=RC$; and in the case of the closed-loop integrator, $T=1/$, where $K$ is the integrator gain (volts per second per volt).

The asympototic rate of attenuation of the classical linear first order low-pass filter is only 20db./decade. Although this may be sought to be increased by the cascading of a plurality of like first order low-pass filter stages yet the above-mentioned attenuation and phase shift at frequencies below the break frequency is also correspondingly and undesirably increased.

SUMMARY OF THE INVENTION

By means of the concept of the subject invention, a nonlinear filter mechanization is employed, which avoids the above-noted limitations of linear filters and provides substantially no attenuation and phase shift at frequencies below a preselected break frequency and having substantially zero volts per volt gain at frequencies above the break frequency.

In a preferred embodiment of the inventive concept, there is provided first and second oppositely poled, unipolarly conductive signaling channels commonly responsively coupled to form an input terminal and output coupled to a summing output terminal for alternatively coupling an input signal and a peak-detected, sampled-and-held input signal to the summing output terminal. The time interval ($T_f$) of the coupling of the peak-detected sampled-and-held input corresponds to the break frequency ($f_{co}$) of the filter $1/T_f=f_{co}$). Each channel comprises peak detection means responsively coupled to a unipolar input of the channel, sample-and-hold means responsive to the unipolar input and to the peak detector output for providing the unipolar peak-detected sampled-and-held signal; and bipolar switching means normally interconnecting the unipolar input to the output terminal and responsively coupled to the peak detection means for alternatively coupling the output terminal to an output of the sample-and-hold means.

In normal operation of the above-described arrangement, a nonlinear describing function is achieved, which demonstrates improved band-pass performance over that of a linear band pass filter. Accordingly, a broad object of the invention is to provide improved means for low-pass filtering.

Another object of the invention is to provide low-pass filtering means having a substantially rectangular spectral band pass characteristic.

A further object is to provide nonlinear low-pass filtering means having a substantially fixed-gain versus frequency response at frequencies below a preselected frequency and substantially zero volts per volt again at frequencies above such preselected frequency.

These and further objects will become apparent from the following description, taken together with the accompanying drawings in which:

BRIEF DESCRIPTION OF THE DRAWINGS

In the figures, like reference characters refer to like parts.

DESCRIPTION OF THE PREFERRED EMBODIMENTS

Figure 1:
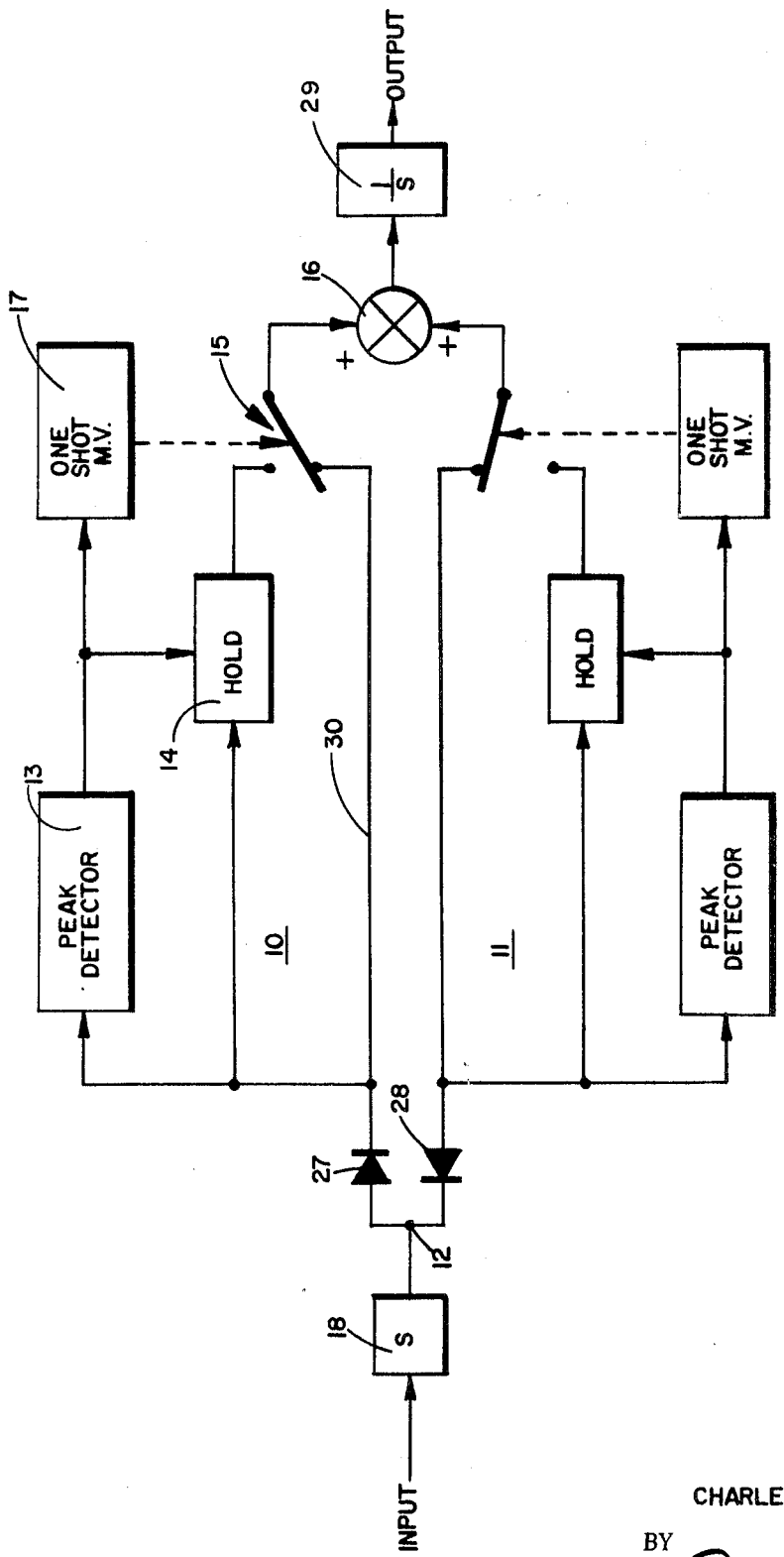
FIG. 1 is a schematic diagram of an embodiment of one aspect of the invention.

Referring now to FIG. 1, there is illustrated a schematic diagram of one aspect of the inventive concept. There is provided first and second oppositely poled unipolarly conductive signalling channels 10 and 11 commonly responsively coupled to form an input terminal 12, and output coupled to a summing output terminal 16. Each of channels 10 and 11 comprises a peak detector 13 responsive to a unipolar input to the signalling channel, and sample-and-hold means 14 responsive to the unipolar input and to an output of peak detector 13 for sampling and holding a peak-detected input signal. There is further provided in each signalling channel bipolar switching means 15 (as illustrated) normally interconnecting a unipolar channel input to output summing terminal 16, and responsively coupled to the output of peak detector 13 by a one-shot multivibrator 17.

In normal operation of the above-described bipolar switching arrangement, upon the occurrence of a preselectively unipolar peak input, peak detected by detector 13, such signal value is sampled and held by sample-and-hold means 14. Also, in response to the occurrence of such peak-detected input, such output of peak detector 13 excites multivibrator 17 from a stable state to an astable state, thus switching bipolar switch 15 so as to alternatively couple output terminal 16 to the output of sample-and-hold means 14. The duration of the interval ($T_f$) of the coupling of the output of sample-and-hold means 14 to output terminal 16 (in response to the occurrence of a peak-detected input) is determined by the design of multivibrator 17, and is preselected to correspond to a desired low-pass filter break frequency, as will be more readily understood by reference to FIGS. 2a and 2b.

Figure 2A:
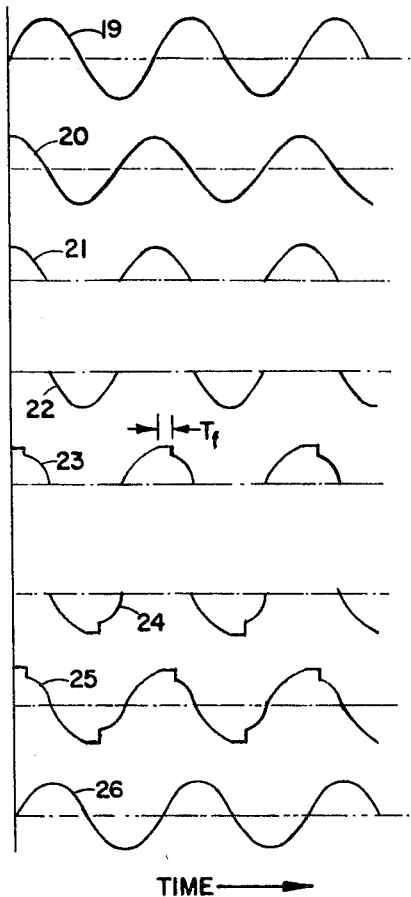
FIGS. 2a and 2b are two families representative time histories of the response of the arrangement of FIG. 1 to a respective single frequency input at a frequency substantially less than and greater than that corresponding to the peak detection sampling interval.

Referring to FIG. 2a, there is illustrated a family of representative time histories of the response of various elements of the arrangement of FIG. 1 to an applied sinusoidal input (curve 19) having a periodicity greater than the sample-and-hold interval ($T_f$) employed by the cooperation of elements 13, 14, 15 and 17 (i.e., the duration of the astable state of multivibrator 17). The input signal represented by curve 19 may be differentiated by an input differentiator 18 (FIG. 1) and the differentiated signal (curve 20 in FIG. 2a) unipolarly, or half-wave, detected by oppositely poled diodes 27 and 28, the respective detected outputs of which are indicated as curves 21 and 22 respectively in FIG. 2. The processing of the positive and negative-detected signals is the same in each of channels 10 and 11, and therefore an explanation of only the processing of the positive-detected signal of channel 10 is sufficient to an understanding of the operation of the device of FIG. 1. Such positive-detected signal also appears at the output of switch 15 (as illustrated in FIG. 1), the output of which switch is illustrated as curve 23 in FIG. 2 a, the corresponding output for channel 11 being illustrated as curve 24. The occurrence of a positive-poled peak value (in curve 21) is detected by detector 13 of channel 10 (in FIG. 1) which responds to (1) gate-on sample-and-hold means 14 to store such peak-detected value and (2) excite multivibrator 17 to change the state of switch 15, whereby the output thereof now samples the peak positive value sampled-and-held by element 14 of FIG. 1 and indicated by the peak plateau of duration $T_f$ in curve 23. After the interval $T_f$, switch 15 is restored to the illustrated stable state of FIG. 1 and the output thereof is again connected by line 30 to the detected output of diode 27, which state change results in a discontinuity in curve 23. The summation by element 16 (in FIG. 1) of the response indicated by curves 23 and 24 is a composite response represented by curve 25, demonstrating the discontinuities of curves 23 and 24. Such discontinuities may be smoothed or attenuated by an output integrator 29, ad indicated by curve 26. The effect of integrator 29 upon the low frequency sinusoidal component of the illustrated input thereto is compensated for by the effect of input differentiator 18. In other words, input differentiator 18 compensatorily shapes the wave shape of the signal to be band pass filtered so as to compensate for the shaping effect of output integrator 29, while at the same time producing not effect in the switching discontinuities which are smoothed by output integrator 29. Hence, the arrangement of FIG. 1 is seen to produce substantially no effect upon an applied sinusoidal input having a periodicity $1/f_1$ greater than the duration $T_f$ of the sampling interval employed $1/f_1 > T_f$.

Figure 2B:
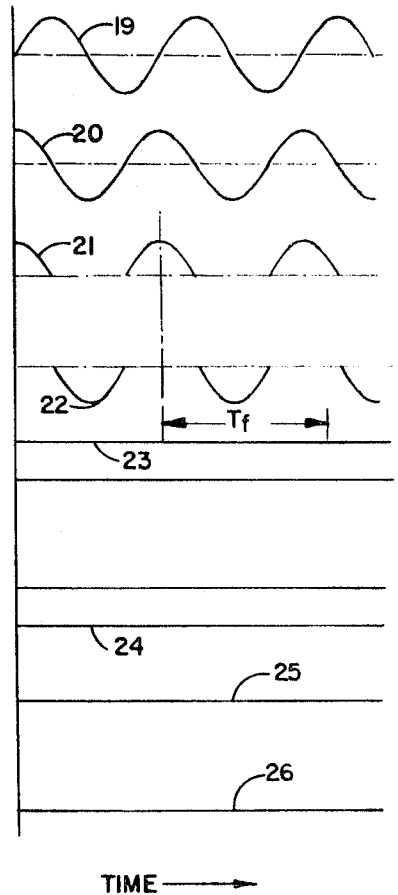

The response of the arrangement of FIG. 1 to an applied sinusoidal input having a periodicity less than the duration of $T_f$ of the sampling interval, is shown in FIG. 2b. Because the duration of the sampling interval $t_f$ is greater than the periodicity of the applied sine wave, switch 15 of channel 10, upon switching from the illustrated first state of FIG. 1 to the second or peak-reading state, is maintained in such state by successive excitations or resettings of multivibrator 17 by detector 13, as to be prevented from returning of the first state. Accordingly, the output of switch 15 in FIG. 1 is continuously indicative of the sampled peak-detected positive polarity of the applied input on terminal 12, and illustrated as curve 23 in FIG. 2b, a similar negative polarity response occuring in channel 11 and illustrated as curve 24 in FIG. 2b. Thus, the two inputs to summing means 16 of FIG. 1 are of equal magnitude and opposite sense whereby the output of summing means 16 is substantially a null. In other words, the arrangements of FIG. 1 provides a null output in response to a sinusoidal input having having a periodicity $1/f_2$ less than the duration of the sampling interval $1/f_2 < T_f$.

Figure 3:
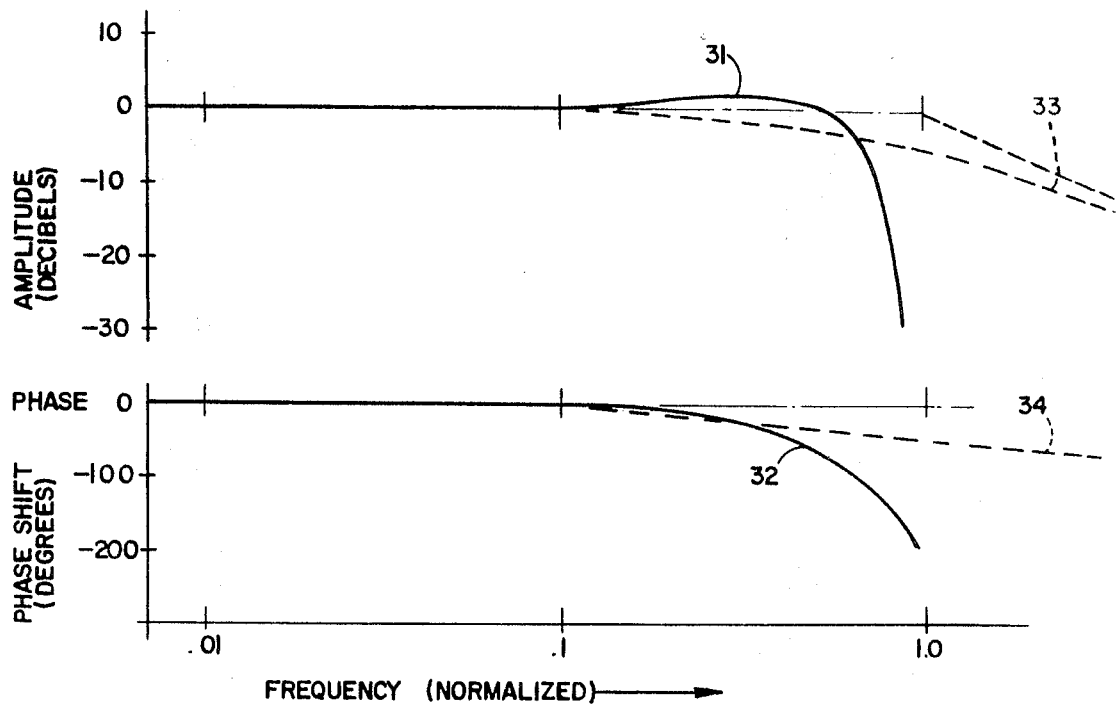
FIG. 3 is a representative Bode diagram of an exemplary response of the arrangement of FIG. 1 to a single frequency input for different frequencies.

Thus it is to be appreciated that the arrangement of FIG. 1, in translating unattentuated a sinusoidal input having a periodicity ($1/f_1 > T_f$) and in attenuating a sinusoidal input having a periodicity ($1/f_2 < T_f$), is effectively a low-pass filter having a break frequency $1/T_f$. A representative amplitude and phase response of such device as a function of frequency is shown as curves 31 and 32 respectively in the Bode diagram of FIG. 3, the frequency being normalized or expressed as a ratio $fT_f$ of the break frequency, $1/T_f$. Also shown as curves 33 and 34 is the frequency response of a conventional first order lag or low-pass filer having a like break frequency. As may be seen from inspection of FIG. 3, the attenuation break about and above the break frequency is much more pronounced for the arrangement of FIG. 1 than for a conventional first order lag.

Although the arrangement of FIG. 1 demonstrates a flatter response within the desired passband and a greater break or increase in attenuation about and above the break frequency, yet such arrangement has an inherent performance limitation or displays an undesirable response to a multiple frequency input. If an input signal of the form, $A_1 \sin 2\pi f_1 t + A_2 \sin 1\pi f_2 t$ is applied to the filer input, where $$1 < f_1 T_f < < f_2 T_f$$

and $$A_2 >> A_1$$

then the break frequency of the device will manifest a shift of $f_2$. In other words, if the input signal is comprised of a large magnitude, high frequency component and a small magnitude, low frequency component, the filter break frequency will be raised to the frequency of such high frequency component. This is caused by the high frequency peaks continuously being detected, resetting the multivibrator and being held by the hold network. The device would thus stepwise follow the highest frequency peaks. If the multivibrator were constructed so that it could not be reset during a set period, then the peak detector would respond to the first high frequency peak after the $T_f$ delay was completed, causing multiple frequency inputs to result in a noisy output having a large frequency component of $2/T_f$ c.p.s.

Figure 4:
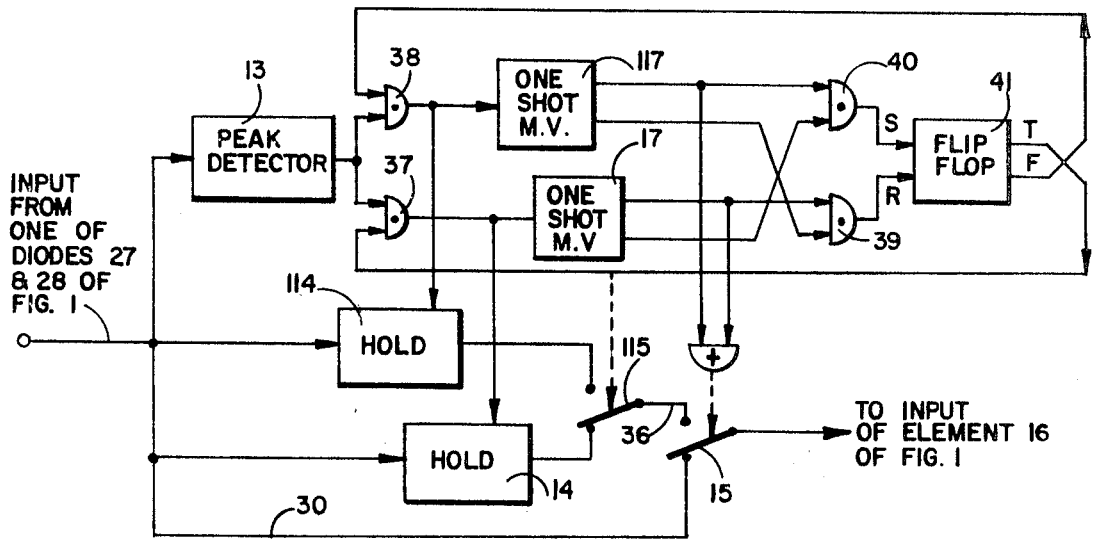
FIG. 4 is a preferred embodiment of each of the opposite-poled, unipolar signalling channels of FIG. 1.

Such undesired shift in break frequency or variation in band pass in response to such complex input signal form, may be avoided by means of the modification of each of channels 10 and 11 illustrated in FIG. 4.

Referring to FIG. 4, there is illustrated a modification to and preferred embodiment of that portion of a signal channel of FIG. 1, interconnecting one of diodes 27 and 28 and a corresponding input of summing means 16. There is provided elements 13, 14, 15 and 30, corresponding to like-referenced elements of FIG. 1. There is also provided means for minimizing variations of the filter frequency response in response to multiple frequency inputs and comprising a second sample-and-hold means 114 and logic means for control of first and second sample-and-hold means 14 and 114 for allowing alternative sampling and holding of a subsequent peak-detected signal occurring sampling and holding of an earlier peak-detected signal.

Such logic control means includes second bipolar switching means or relay 115 interposed in circuit for connecting an alternate one of the outputs of first and second sample-and-hold means 14 and 114 to a sample-and-hold input 36 of first switching means or relay 15. There is also included a first and second coincidence gate 37 and 38, each having a first input coupled to an output of peak detector 13 and further having a second input. A control input of each of first monostable signalling means 17 and first sample-and-hold means 14 is coupled to an output of gate 37, while a control input of each of a second monostable signalling means 117 and a second sample-and-hold means 114 is coupled to an output of second gate 38.

There is further provided in the logic arrangement of FIG. 4 third and fourth coincidence gates 39 and 40, each responsive to mutually exclusive states of monostable signalling means 17 and 117, third gate 39 being responsive to an astable state of first monostable means 17 and a stable state of second monostable means 117, while fourth gate 40 is responsive to an astable state of second monostable means 117 and a stable state of first monostable means 17. The output of a respective one of coincidence gates 39 and 40 is applied to a respective one of the set and reset inputs of an output flip-flop or bistable signalling means 41, the outputs thereof being fed as logic inputs to mutually exclusive ones of gates 37 and 38. For example, the "false" output of flip-flop 41 (associated with the "reset" input thereto from gate 39) is fed to gate 38, while the "true" output of flip-flop 41 (associated with the "set" input thereto from gate 40) is fed to gate 37 and is also used as a switching control input for second switch 115. The switching control input to first switch 15 is "OR" gate coupled to the astable outputs of monostable means 17 and 117.

Figure 5:
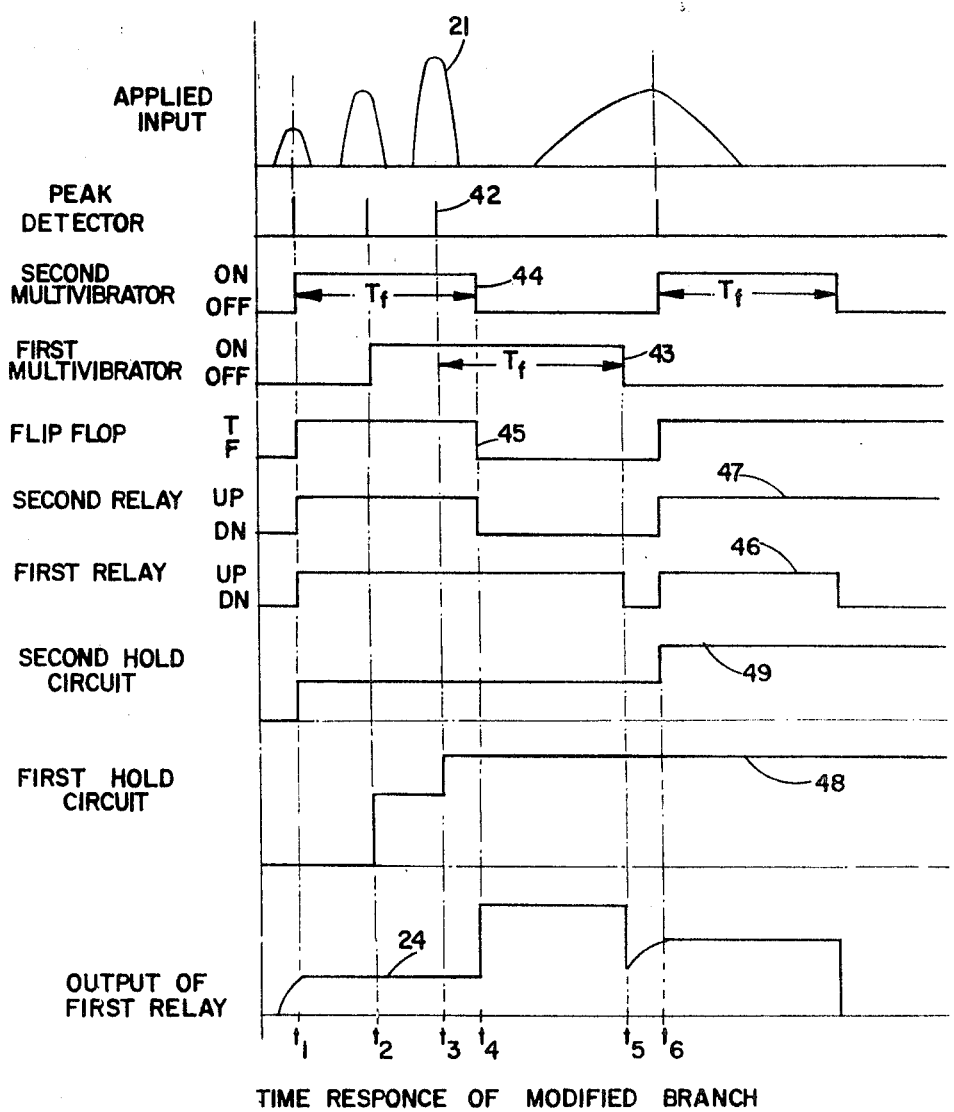
FIG. 5 is a family of representative time histories of the response of the arrangement of FIG. 4 to a complex (multiple frequency) input.

The cooperation of the arrangement illustrated in FIG. 4 may be more conveniently appreciated from a consideration of FIG. 5.

Referring to FIG. 5, there is illustrated a family of exemplary time histories of the responses of certain elements of FIG. 4 in response to an applied multiple frequency input. Curve 21 represents a half-wave detected or unipolarly detected input to line 30 (of FIG. 4) from say, diode 27 of FIG. 1. Such input is seen to represent a composite input having both a high amplitude, high frequency component (as indicated by the short period peak amplitude lobes included in such response) and a low amplitude low frequency component (as indicated by the slow rate of variation of the amplitude of the short periodicity lobes and by the presence of the low amplitude long periodicity lobe). It is to be appreciated that even if the low frequency and high frequency components of an applied input to differentiator 18 (of FIG. 1) were of like amplitude, the effect of differentiator 18 would yet enhance the amplitude of the high frequency component relative to the gain effect upon the low frequency component:

$$\frac{d(A \sin \omega t)}{dt} = -\omega A \cos \omega t = A' \cos \omega t$$

In other words, the amplitude $A'$ of the differentiated component will vary directly as the frequency $\omega$ represented by such component.

Curve 42 represents the occurrence of a peak-detected output at peak detector 13 in response to the input illustrated by curve 21, which peak-detected output (in coincidence with a preselected state of flip-flop 41) gates on a preselected one of gates 37 and 38, the responses of which are indicated by curves 43 and 44, respectively. Curve 45 represents the state of flip-flop 41; curves 46 and 47 respectively represent the states of respective ones of switches 15 and 115; curves 48 and 49 respectively represent the responses of sample-and-hold means 14 and 114, respectively; and curve 24 represents the output from first switch 15 in FIG. 4. With an initial "false" state of flip-flop 41 (the response of which is illustrated as curve 45), the first occurrence (at $t_1$) of an output of peak detector 13 (curve 42) results in an output at gate 38 which: (1) turns on hold circuit 114 (as indicated by a change in state of curves 49), and (2) turns on multivibrator 117 (as indicated by a change in state of curve 44), thereby setting flip-flop 41 in its true state (as indicated by the change in state of curve 45 at $t_1$).

The turning one of second multivibrator 117 (as indicated by curve 44 at $t_1$) serves to switch first relay 15 from its illustrated first state (in FIG. 1) to a second state (as indicated by curve 46 at $t_1$), while the "true" state of flip-flop 41 (curve 45 at $t_1$) switches second relay 115 from its first state (as illustrated in FIG. 4) to a second state (as indicated by curve 47 in FIG. 5).

Thus, the output of switch 15 prior to $t_1$ (as indicated by curve 24 in FIG. 5) corresponds to the response indicated by curve 21 during such interval, while the output of switch 15 subsequent to $t_1$ (and prior to $t_2$) corresponds to the peak value of curve 21 sampled at time $t_1$ and held by element 114.

Upon the occurrence of a second peak in curve 21 (indicated by curve 42 at $t_2$) within the multivibrator response interval $T_f$ subsequent to $t_1$ (curve 44 of the multivibrator 117 is still "on") such output of detector 13, in coincidence with the sustained "true" state of flip-flop 41, causes gate 37 to gate-on first multivibrator 17 (as indicated by the change in state of curve 43 at $t_2$) and also turns on first sample-and-hold means 14 (as indicated by the change in state of curve 48 at $t_2$). Because of the symmetrical arrangement of the logic input to flip-flop 41 and switch 15, the states thereof are not affected by the second peak. Also, because the state of flip-flop 41 is so unaffected, the state of switch 115 is unaffected. Thus, in the interval subsequent to $t_2$ and prior to $t_3$, the output of switch 15 continues to be indicative of the sample-and-hold value stored in element 114 (as indicated by curve 24 in the interval between $t_2$ and $t_3$.

When a third peak occurs in curve 21 (as indicated by curve 42 at $t_3$) within the multivibrator response interval $T_f$, subsequent to $t_2$(multivibrator 17 still "on" as indicated by curve 43 at $t_3$), gate 37 resets multivibrator 17 (curve 43 subsequent to $t_3$). and hold circuit 14 is set to the new peak value (curve 48 at $t_3$).

When multivibrator 117 turns off at $(t_1+T_f)$, indicated by curve 44 at $t_4$, gate 39 then resets flip-flop 41 to the "flase" state (curve 45 at $t_4$). Such change of state of flip-flop 41 switches relay 115 to the illustrated first state (in FIG. 4), indicated by the change in state of curve 47 at $t_4$ (in FIG. 5), which results in the output of switch 15 being coupled to the detected value (curve 48 at $t_4$) of the third peak which is held by element 114, as indicated by the change in state of curve 24.

When the first multivibrator 17 turns off at $(t_3+T_f)$, as indicated by curve 43 at $t_5$, and in the concomitant presence of the "off" state of multivibrator 117 (curve 44 at $t_5$), switch 15 is restored to its illustrated first state (curve 46 in the interval $t_5$ to $t_6$). In such first state, switch 15 operates an output (curve 24 between $t_5$ and $t_6$) indicative of the input on line 30 (curve 21 between $t_5$ and $t_6$).

Upon the occurrence of a fourth peak at $t_6$ and no subsequent peaks, such value is detected, held and applied at the output of switch 15 for the multivibrator interval $T_f$(curve 24 at $t_6$ to $(t_6+T_f)$).

Accordingly, it is appreciated that the positive polarity signalling channel of FIG. 4 responds to an applied input comprising a high amplitude, high frequency $(f_2>1/T_f$ component and a low amplitude, low frequency $(f_1<1/T_f$ component to provide an output indicative which, when combined with that of an associated negative-polarity signalling channel, is indicative of the low frequency spectral content of such input.

Therefore, there has been described an improved low-pass filter employing a nonlinear mechanization and responsive to multiple-frequency, or random-appearing, inputs to provide improved response within the low-pass band pass of interest and enhanced attenuation of spectral components about and above the break frequency of such low-pass band pass.

Although the invention has been described and illustrated in detail, it is to be clearly understood that the time is by way of illustration and example only and is not to be taken by way of limitation, the spirit and scope of this invention being limited only by the terms of the appended claims.

I claim:

1. A nonlinear low-pass filter having an input and an output and comprising first and second oppositely poled unipolarly conductive signalling channels commonly responsively coupled to form an input terminal and output coupled to a summing output terminal for alternatively coupling an input signal and a peak-detected, sampled-and-held input signal to the summing output terminal, said filter having substantially no attenuation and no phase shift at frequencies below a selected break frequency corresponding to the reciprocal of a coupling interval of said coupled peak-detected sampled-and-held signal and having substantially zero volts per volt gain at frequencies above said break frequency, each said channel comprising a series-input-coupled diode, said diodes of said channels being mutually oppositely poled;

peak-detection means responsively coupled to an input of said channel for peak-detection of an input applied thereto;

first sample-and-hold means responsive to said input of said channel and an output of said peak detection means for sampling and holding said unipolar peak-detected input signal;

first bipolar switching means normally interconnecting said input of said channel to an output thereof and responsively coupled to an output of said peak detection means for alternatively coupling said output of said channel to an output of said sample-and-hold means for a preselected interval corresponding to the break frequency of said filter.

2. The device of claim 1 in which there if further provided means for minimizing variations in the frequency response of the filter in the presence of a multiple frequency input.

3. The device of claim 1 in which there if further provided means for minimizing variations of the frequency response of the filter in response to multiple frequency inputs and comprising second sample-and-hold means responsively connected to said input of said channel; and logic control means for control of said first and second sample-and-hold means for allowing alternative sampling and holding of a subsequent peak detected signal occurring during sampling and holding of an earlier peak-detected signal.

4. A nonlinear low-pass filter having an input and an output and comprising first and second oppositely poled unipolarly conductive signalling channels commonly responsively coupled to form an input terminal and output coupled to a summing output terminal for alternatively coupling an output signal and a peak-detected, sample-and-held input signal to the summing output terminal, said filter having substantially no attenuation and no phase shift at frequencies below a selected break frequency corresponding to the reciprocal of a coupling interval of said coupled peak-detected sampled-and-held signal and having substantially zero volts per volt gain at frequencies above said break frequency, each said channel comprising:

a series-input-coupled diode, said diodes of said channels being mutually oppositely poled;

means for peak detection responsively coupled to a unipolar input of said channel;

sample-and-hold means response to said input of said channel and to an output of said peak detection means for sampling and holding a peak-detected input signal; and bipolar switching means normally interconnecting said input of said channel to an output thereof and responsively coupled to said peak detection means for alternatively coupling said output of said channel to an output of said sample-and-hold means for a preselected interval.

5. A nonlinear low-pass filter having an input and an output and comprising first and second oppositely poled unipolarly conductive signalling channels commonly responsively coupled to form an input terminal and output coupled to a summing output terminal for alternatively coupling an input signal and a peak-detected, sampled-and-held input signal to the summing output terminal, said filter having substantially no attenuation and no phase shift at frequencies below a selected break frequency corresponding to the reciprocal of a coupling interval of said coupled peak-detected sampled-and-held signal and having substantially zero volts per volt gain at frequencies above said break frequency, and comprising an input differentiator; and an output summing integrator, said first and second oppositely poled unipolarly conductive signalling channels being responsively coupled to an output of said differentiator, an input of said integrator being coupled to said summing output terminal, each of said signalling channels comprising a series-input-coupled diode, said diodes of said channels being mutually oppositely poled;

a peak detector responsively coupled to an input of said channel;

first sample-and-hold means responsive to said input of said channel and an output of said peak detector for providing sampling and holding a peak-detected input signal; and first bipolar switching means normally interconnecting said input of said channel to an output thereof and responsively coupled to an output of said peak detector for alternatively coupling said output of said channel to an output of said sample-and-hold means for a preselected interval corresponding to the break frequency of said filter.

6. The device of claim 5 in which there is further provided means for minimizing variations of the frequency response of the filter in response to multiple frequency inputs and comprising second sample-and-hold means; and logic control means for control of said first and second sample-and-hold means for allowing alternative sampling and holding of a subsequent peak-detected signal occurring during sampling and holding of an earlier peak-detected signal.

7. The device of claim 6 in which said logic control means comprises second bipolar switching means interposed in circuit for connecting an alternative one of the outputs of said first and second sample-and-hold means to a sample-and-hold input of said first bipolar switching means; and bistable signalling means responsively coupled to said peak detector for providing a two-state control signal, the state of which alternates in response to successive outputs of said peak detection means, a control input of said second bipolar switching means being responsive to said two-state control signal.

8. A nonlinear low-pass filter having an input and an output and comprising first and second oppositely poled unipolarly conductive signalling channels commonly responsively coupled to form an input terminal and output coupled to a summing output terminal for alternatively coupling an input signal and a peak-detected, sampled-and-held input signal to the summing output terminal, said filter having substantially no attenuation and no phase shift at frequencies below a selected break frequency corresponding to the reciprocal of a coupled interval of said coupled peak-detected sampled-and-held signal and having substantially zero volts per volt gain at frequencies above said break frequency, and comprising an input differentiator; and an output summing integrator, said first and second oppositely poled unipolarly conductive signalling channels being responsively coupled to an output of said differentiator, an input of said integrator being coupled to said summing output terminals, each of said signalling channels comprising a series-input-coupled diode, said diodes of said channels being mutually oppositely poled;

a peak detector responsively coupled to said input terminal;

first and second sample-and-hold means each having a sampling input coupled to said input terminal and further having a sample control input;

a first bipolar relay having a first and second switchable input connected to an output of a mutually exclusive one of said sample-and-hold means, and further having a switch control input and output;

a second bipolar relay having a first and second switchable input connected to a respective one of said output of said first relay and said input terminal and further having an output coupled to said output terminal and also having a switch control input;

a first and second coincidence gate, each gate having a first input coupled to an output of said peak detector and further having a second input;

first and second monostable signalling means, each having an input coupled to an output of a mutually exclusive ones of said first and second coincidence gates;

third and fourth coincidence gates, each responsive to mutually exclusive states of said monostable signalling means, said third coincidence gate being responsive to an astable state of said first monostable signalling means and a stable state of said second monostable signalling means;

bistable signalling means having a first and second input responsive to an output of mutually exclusive ones of said third and fourth coincidence gates; and a switching control input of said first bipolar relay being responsive to an astable state of each of said monostable signalling means and a switching control input of said second bipolar relay being responsive to a preselected state of said bistable signalling means.

9. A nonlinear low-pass filter having an input and an output and comprising first and second oppositely poled unipolarly conductive signalling channels commonly responsively coupled to form an input terminal and output coupled to a summing output terminal for alternatively coupling an input signal and a peak-detected, sampled-and-held input signal to the summing output terminal, said filter having substantially no attenuation and no phase shift at frequencies below a selected break frequency corresponding to the reciprocal of a coupling interval of said coupled peak-detected sampled-and-held signal and having substantially zero volts per volt gain at frequencies above said break frequency, and comprising an input differentiator; and an output summing integrator;

said first and second oppositely poled unipolarly conductive signalling channels responsively coupled to an output of said differentiator and output coupled to a respective input of said summing integrator, each of said channels comprising a series-input-coupled diode, said diodes of said channels being mutually oppositely poled;

a peak detector responsively coupled to a unipolar input of said channel, and sample-and-hold means responsive to said input of said channel and having a control input responsively coupled to said peak detector for sampling and holding a peak-detected input signal, and bipolar switching means normally interconnecting said input of said channel to an output thereof and responsively coupled to said peak detector for alternatively coupling said output of said sample-and-hold means for a preselected interval.

10. A nonlinear low-pass filter having an input and an output and comprising first and second oppositely poled conductive signalling channels commonly responsively coupled to form an input terminal and output coupled to a summing output terminal for alternatively coupling an input signal and a peak-detected, sampled-and-held input signal to the summing output terminal said filter having substantially no attenuation and no phase shift at frequencies below a selected break frequency corresponding to the reciprocal of a coupling interval of said coupled peak-detected sampled-and-held signal and having substantially zero volts per volt gain at frequencies above said break frequency, and comprising an input differentiator; and an output summing integrator;

said first and second oppositely poled unipolarly conductive signalling channels being responsively coupled to an output of said differentiator and output coupled to a respective input of said integrator, each of said channels comprising a series-input-coupled diode, said diodes of said channels being mutually oppositely poled;

peak-detecting means responsive to a unipolar input of said channel for sampling and holding a peak-detected input signal; and bipolar switching means normally interconnecting said input of said channel to an output thereof, and responsive to the occurrence of a peak-detected input for alternatively coupling said output of said channel to said means for sampling and holding a preselected interval.

11. A nonlinear low-pass filter having an input and an output and comprising first and second oppositely poled unipolarly conductive signalling channels commonly responsively coupled to form an input terminal and output coupled to a summing output terminal for alternatively coupling an input signal and a peak-detected, sampled-and-held input signal to the summing output terminal, said filter having substantially no attenuation and no phase shift at frequencies below a selected break frequency corresponding to the reciprocal of a coupling interval of said coupled peak-detected sampled-and-held signal and having substantially zero volts per volt gain at frequencies above said break frequency, each said channel comprising a series-input-coupled diode, said diodes of said channels being mutually oppositely poled;

peak detection means responsively coupled to a unipolar input of said channel;

sample-and-hold means responsively coupled to said unipolar input and further responsive to said peak detection means for providing a unipolar peak-detected sampled-and-held signal; and monostable bipolar switching means normally interconnecting said unipolar input to a responsive input of said summing output terminal and responsively coupled to said peak detection means for alternatively coupling said input of said summing output terminal to an output of said sample and hold means.

12. The device of claim 11 in which there is further provided:

output signal-smoothing means responsively coupled to said summing output terminal; and compensatory signal-shaping means interposed at input of said filter and having a describing function corresponding to the reciprocal of the describing function of said output signal-smoothing means.